United States Patent
Forshaug

(10) Patent No.: US 9,335,831 B2
(45) Date of Patent: May 10, 2016

(54) COMPUTER KEYBOARD INCLUDING A CONTROL UNIT AND A KEYBOARD SCREEN

(71) Applicant: ADAPTABLE KEYS A/S, Oslo (NO)

(72) Inventor: Rune Forshaug, Oslo (NO)

(73) Assignee: ADAPTABLE KEYS A/S, Oslo (NO)

(*) Notice: Subject to any disclaimer, the term of this patent is extended or adjusted under 35 U.S.C. 154(b) by 18 days.

(21) Appl. No.: 14/053,087

(22) Filed: Oct. 14, 2013

(65) Prior Publication Data

US 2015/0103007 A1    Apr. 16, 2015

(51) Int. Cl.
*G06F 3/023* (2006.01)
*G06F 3/0354* (2013.01)

(52) U.S. Cl.
CPC .......... *G06F 3/0233* (2013.01); *G06F 3/03543* (2013.01)

(58) Field of Classification Search
None
See application file for complete search history.

(56) References Cited

U.S. PATENT DOCUMENTS

| 6,097,374 A * | 8/2000 | Howard ..................... 345/168 |
| 6,772,980 B2 | 8/2004 | O'Neill |
| 2010/0261526 A1* | 10/2010 | Anderson et al. ............... 463/31 |
| 2013/0265218 A1* | 10/2013 | Moscarillo ..................... 345/156 |

FOREIGN PATENT DOCUMENTS

| WO | WO 2008/043232 A1 | 4/2008 |
| WO | WO 2012/075197 A2 | 6/2012 |

* cited by examiner

*Primary Examiner* — Kenneth B Lee, Jr.
(74) *Attorney, Agent, or Firm* — Foley & Lardner LLP

(57) ABSTRACT

An ergonomic writing apparatus including a keyboard screen integrated in the ordinary screen image, alternatively an independent keyboard screen, which interacts with a control unit. When the control arm/lateral joystick is moved, then two cursors which can be moved independently of each other and simultaneously, are displaceable over the columns of characters in the keyboard image. A choice of keys in the keyboard windows and control of the ordinary PC functions is realized by finger keys.

22 Claims, 8 Drawing Sheets

COMPUTER KEYBOARD INCLUDING A CONTROL UNIT AND A KEYBOARD SCREEN

The invention relates to a writing apparatus for a personal computer or PC, which is a refinement of a traditional keyboard. It includes a keyboard screen and a control unit.

The keyboard principle and the look of the keyboard for a typewriter have not substantially altered in the last 100 years. The invention was originally designed with the aim of getting letters and symbols down on the paper (2) in an effective manner. A refinement of a traditional PC keyboard should therefore mean that the writing apparatus will continue to be quick and easy to use, at the same time as it should be simple to make ergonomic adaptations.

There are various adapted tools for writing on a PC, the majority of which are designed with a view to a specific physical or cognitive injury.

Known ergonomic methods in relation to choosing characters in a keyboard include: U.S. Pat. No. 6,772,980 B2 (D1), WO 2012/075197 A2 (D2) and WO 2008/043232 A1 (D3).

D1 describes an ergonomic writing apparatus/supporting device for keying-in of characters on a computer, which prevents injuries in connection with the use of the computer. The apparatus is borne by the upper body of the user and receives support from the waist and upper back of the user. A solution for controlling of a mouse can also be mounted on the device.

D2 describes a dynamic touch display keyboard, which dynamically adjusts itself to the fingers of the user in accordance with a virtual "home row". The fingers rest on the screen and placement of the keyboard in the screen image is dependent on where the fingers on each hand are first placed. There can be a separate keyboard for each hand, possibly having a curved shape.

D3 shows an ergonomic keyboard in which all alphabetic keys, as well as numbers and symbol keys, are placed on the back of the keyboard, which is out of sight of the operator. The position of the keys on the back of the keyboard is shown by key indicia on the front of the keyboard, such that the operator can locate the keys on the back of the keyboard.

The present invention is not just designed as a new tool, but is meant as an entirely new principle for writing on a PC. The writing apparatus is quick, easy and comfortable to use. The possibility is here given of taking account of hand, arm, elbow, shoulder and neck position, and we can choose which muscles we wish to load and which torsions we wish to avoid.

A better and more flexible ergonomic adaptation of a writing apparatus for a PC is achieved according to the invention by breaking free from the traditional desk keyboard.

The writing apparatus in this application includes a keyboard screen which is integrated in the lower part of an ordinary PC screen which is controlled by a control unit attached to an office chair. Choice of keys in the keyboard image is controlled by an arm movement in combination with finger keys.

The arm movements control two cursors in the keyboard image, and the finger keys choose the desired key in the highlighted area. This writing apparatus is easy to adapt ergonomically because there are many possibilities for combining movement with the use of finger keys. This writing apparatus is also fast to use due to finger placement, movement pattern and possibility of shifting quickly between the highlighted fields on the keyboard screen. The structure of the integrated keyboard is also easily recognizable in relation to the traditional keyboard. The invention is characterized by the features which emerge from the appended patent claims.

BRIEF DESCRIPTION OF THE DRAWINGS

An inventive writing apparatus for a PC, which is a refinement of a traditional keyboard, is shown in the drawings. A clearer understanding of the advantages of the invention will be acquired when description and patent claims are viewed in connection with the associated drawings.

DETAILED DESCRIPTION OF THE PREFERRED EMBODIMENTS

Figure 1:
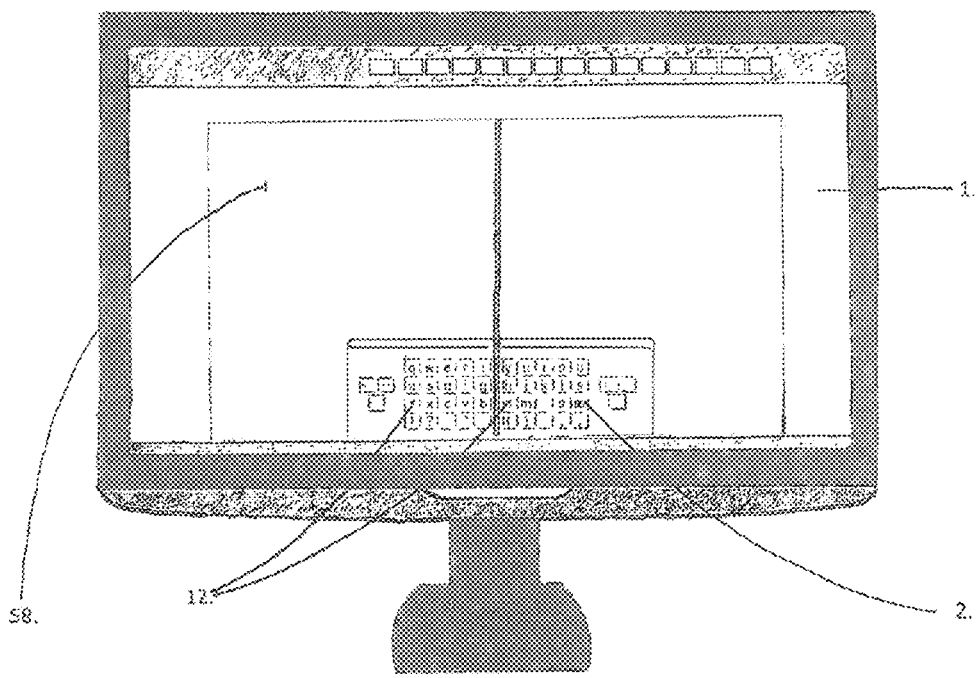
FIG. 1 shows a keyboard window integrated in the ordinary screen image, a cursor for a right hand and a cursor for a left hand are placed in an extreme left position.
Figure 2:
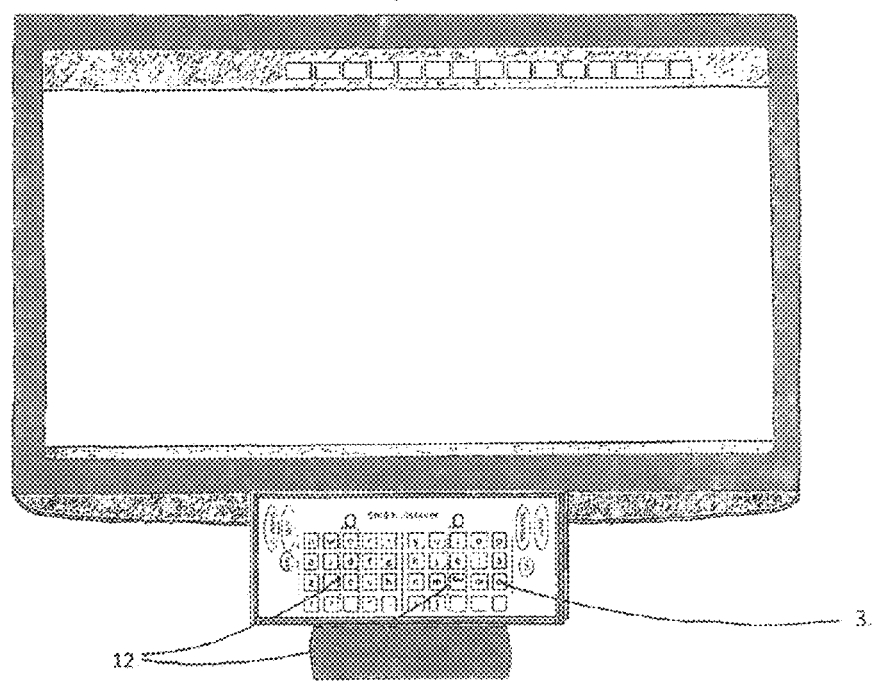
FIG. 2 shows an independent keyboard screen below the ordinary screen image, a cursor for a right and left hand are placed in a middle position.
Figure 3:
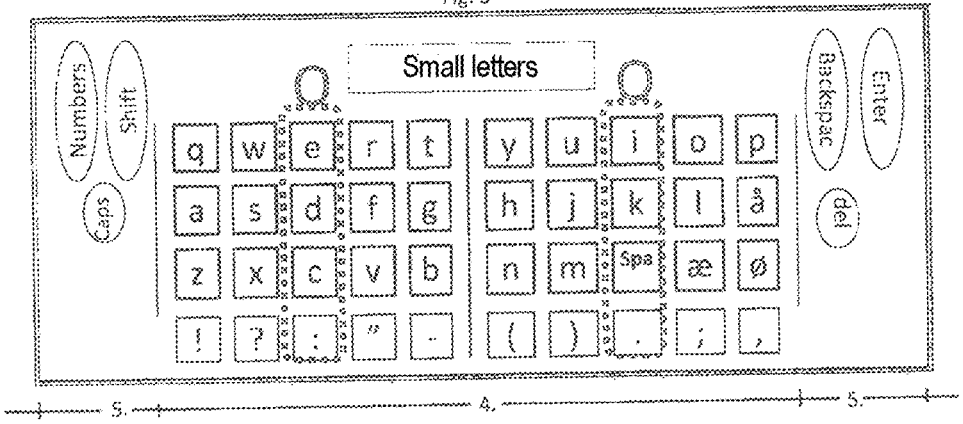
FIG. 3 shows a keyboard screen image comprising small letters and some symbols, here the primary region with 40 keys and the secondary region with placement of thumb keys on the manual control are shown.
Figure 4:
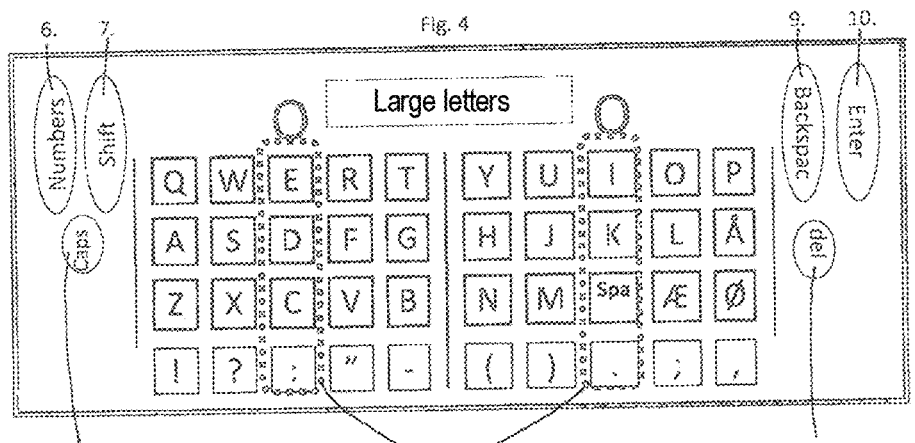
FIG. 4 shows a keyboard screen image for large letters and with cursor for right hand and cursor for left hand in a middle position, here thumb keys for right and left hand are also shown.
Figure 5:
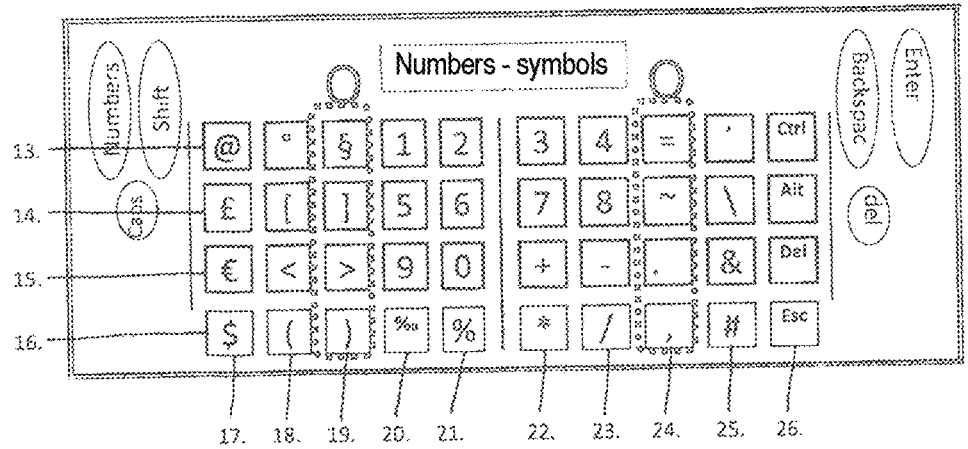
FIG. 5 shows a keyboard screen image for numbers and symbols with 5 columns of keys for left hand+5 columns of keys for right hand=10 columns of keys, here 4 rows, controlled by index figure, long figure and ring finger and little finger, are also shown.
Figure 6:
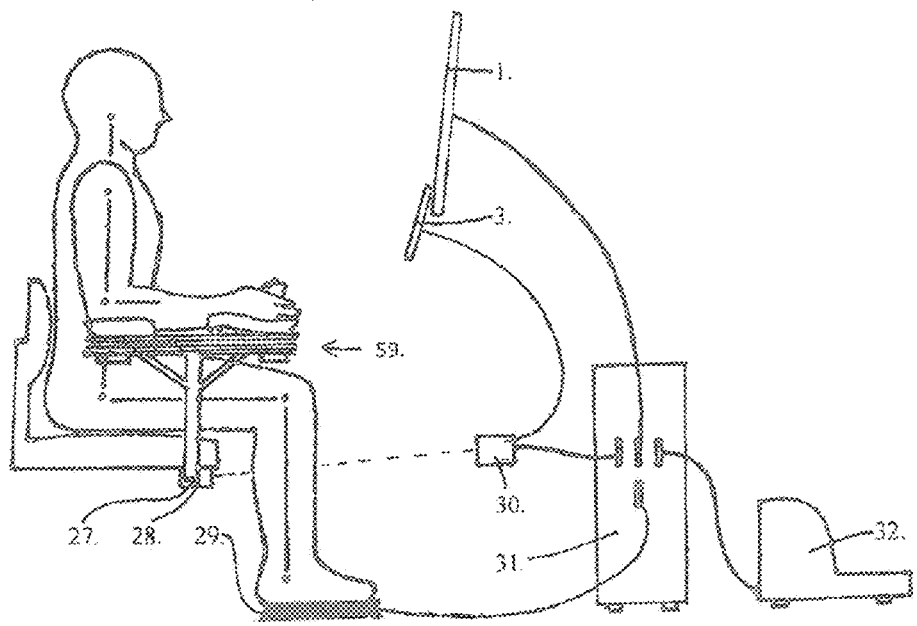
FIG. 6 shows a person from the side in working position with control unit attached to the armrest.
Figure 7:
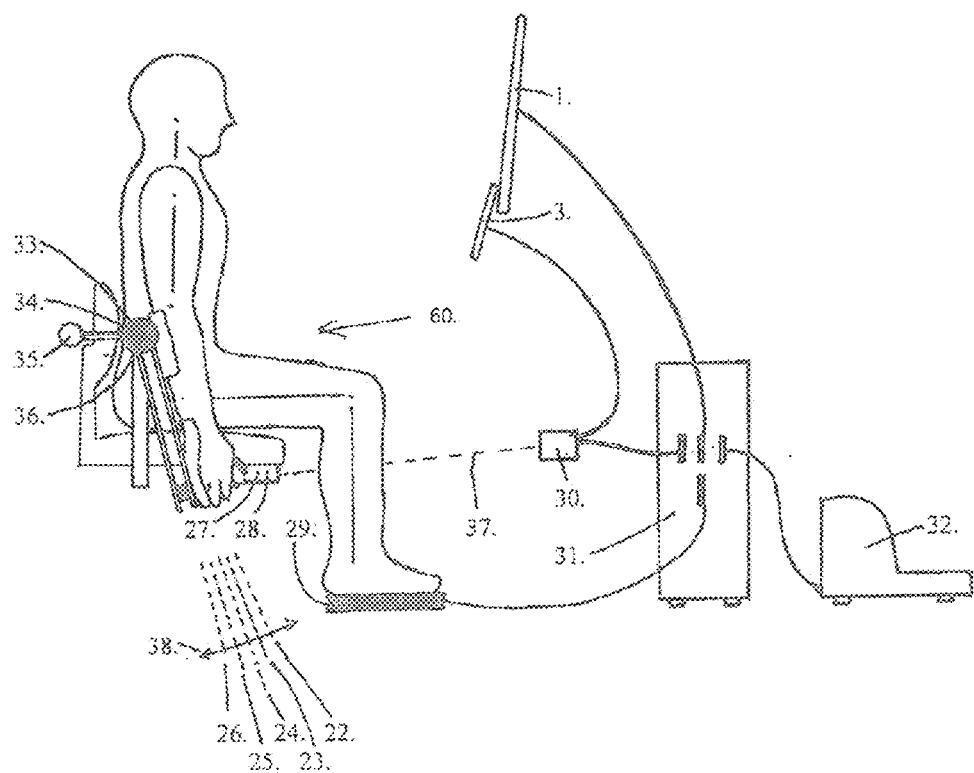
FIG. 7 shows a person from the side in working position with control unit for hanging arms.
Figure 10:
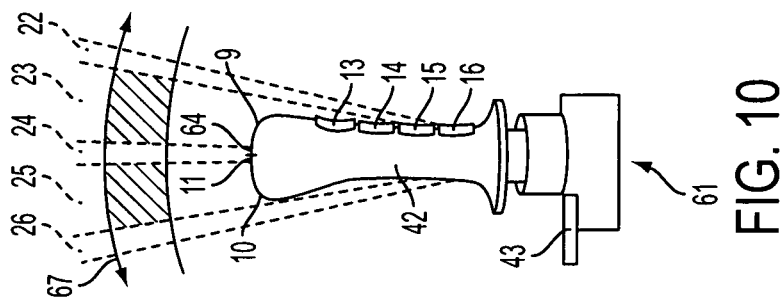
FIG. 10 shows control unit on armrest with mounted joystick, here the joystick is shown viewed from the front and the different side positions for the joystick are marked.
Figure 9:
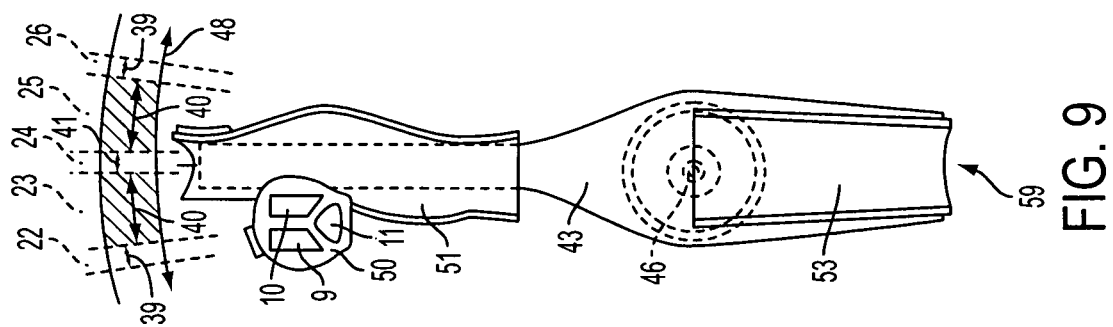
FIG. 9 shows control unit on armrest with pivotable control arm which moves cursor on the keyboard screen, here it is also shown that the intermediate positions have larger contact surface against cursor on the keyboard screen than with an outer position and middle position.
Figure 8:
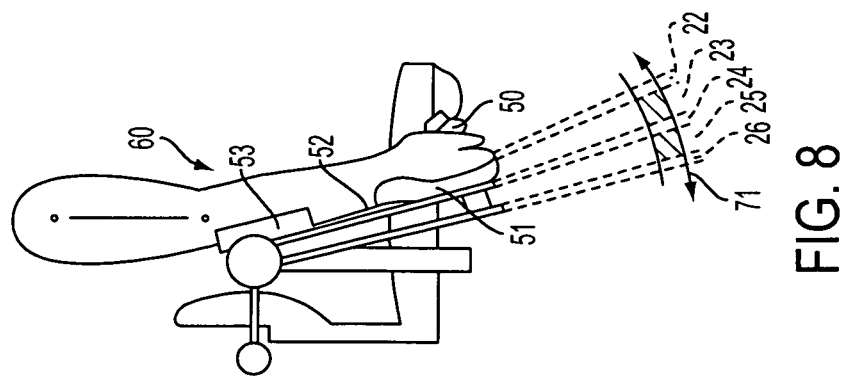
FIG. 8 shows a control unit for hanging arms and connection between arm position and placement of cursor on the keyboard screen.
Figure 11:
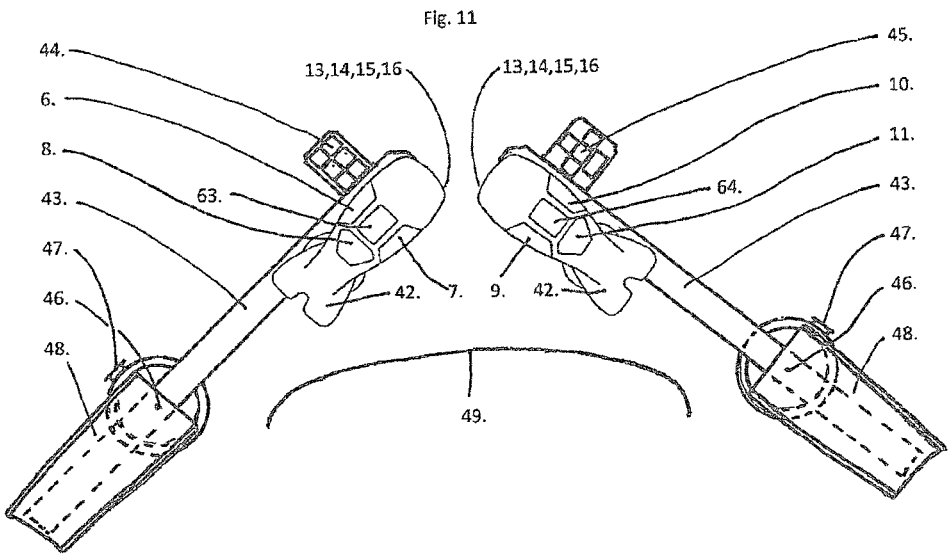
FIG. 11 shows control unit on armrest with mounted joystick, here an ergonomic working position in which hands and arms work close to the body is shown.
Figure 12:
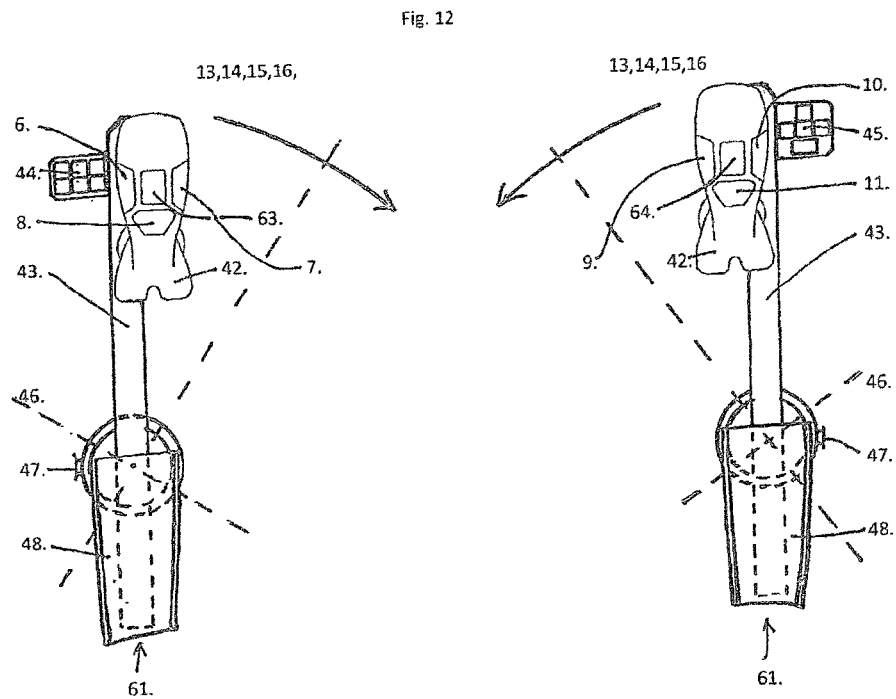
FIG. 12 shows control unit on armrest with mounted joystick, here a working position in which arms and hands work parallel with the armrests on the office chair are shown, and also a mini keyboard mounted on right and left control arm are shown here, which control arm can be locked in different positions.
Figure 13:
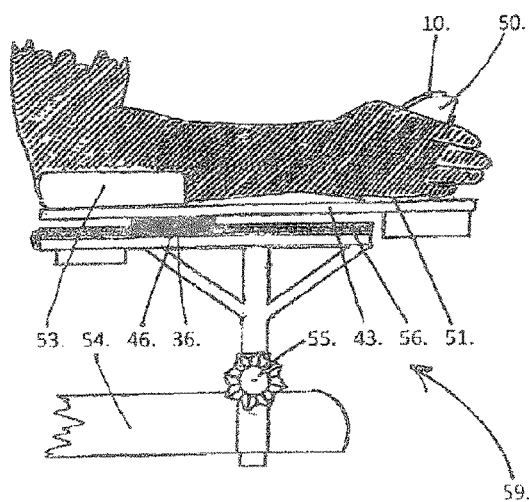
FIGS. 13 and 14 show control unit on armrest with pivotable control arm which moves cursor.
Figure 14:
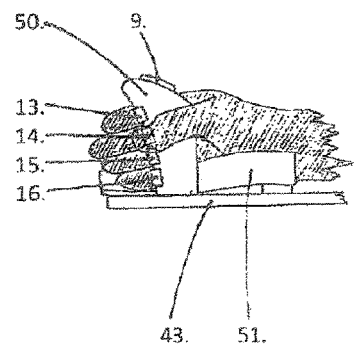
Figure 15:
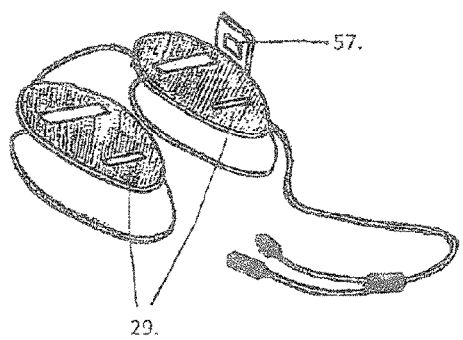
FIG. 15 shows a foot mouse with changeover switch.
Figure 16:
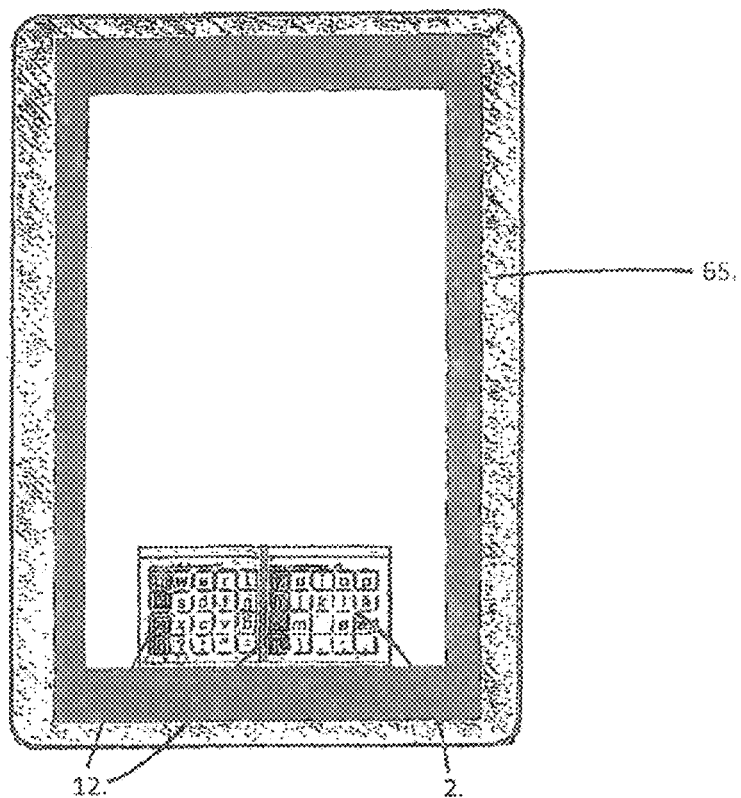
FIGS. 16 and 17 respectively show a computer tablet in portrait and landscape orientation.
Figure 17:
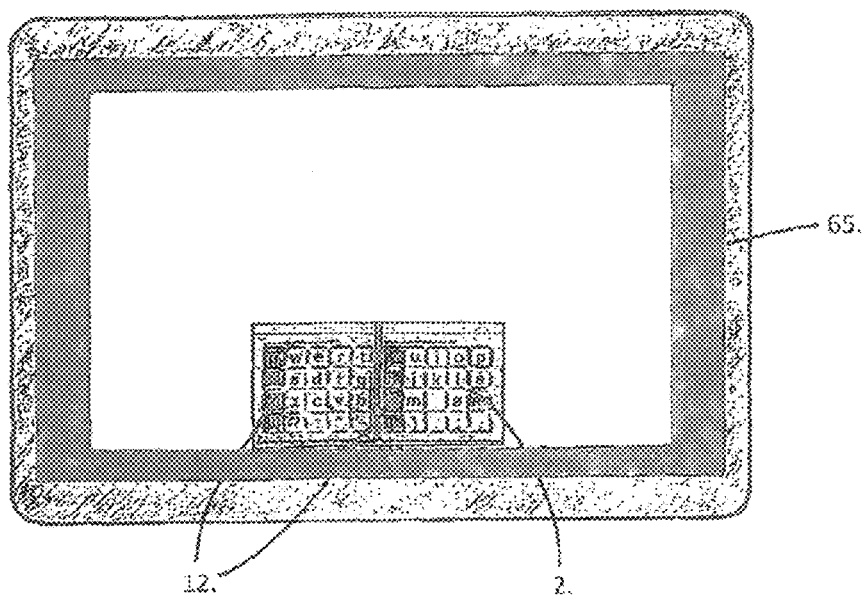
Figure 18:
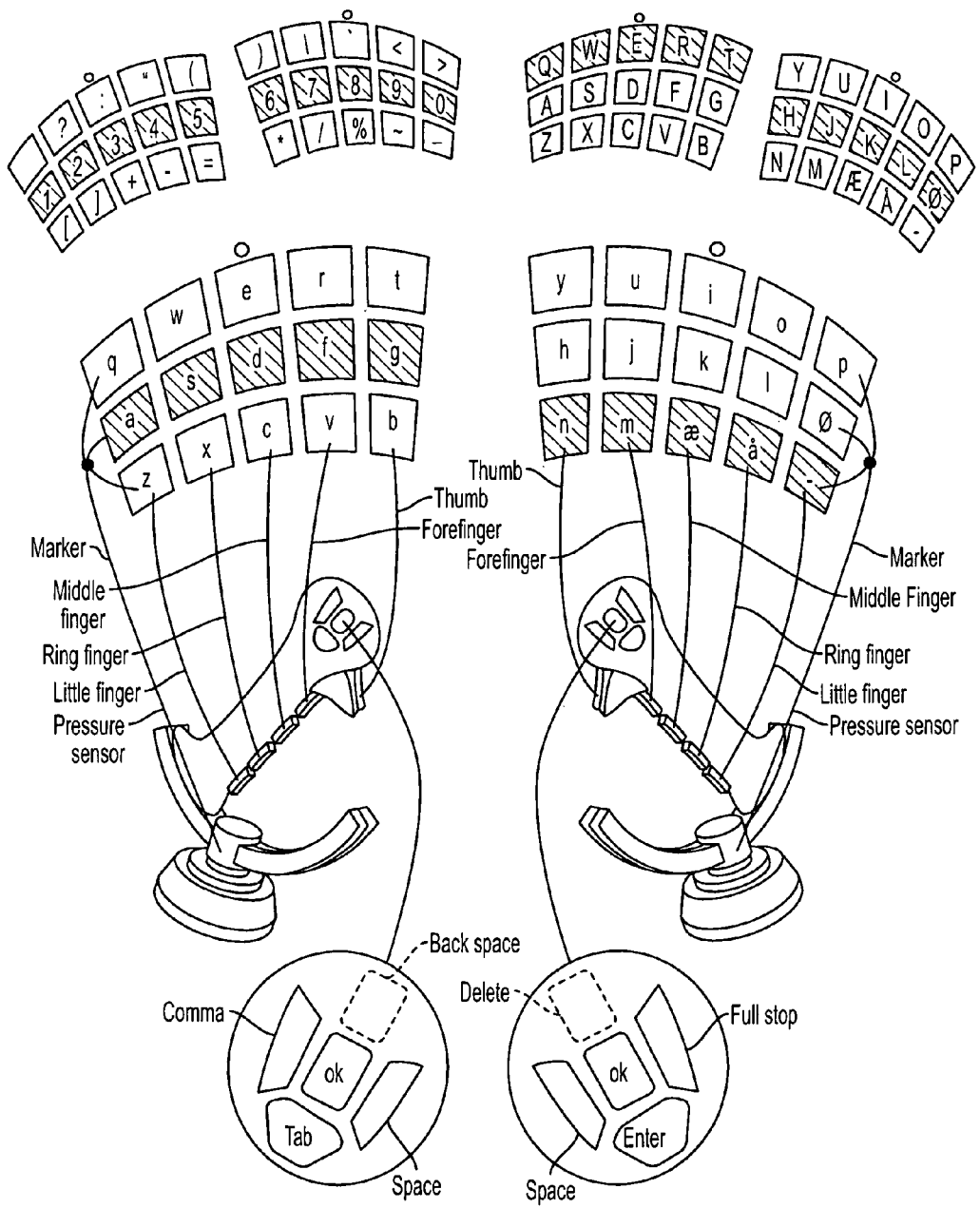
FIG. 18 shows control units for the left and right hands.

In one preferred embodiment, the invention includes handheld control units having built-in sensors and dedicated keys for each finger, which combines hand positioning with a choice of finger keys in order to control the choice of keys in a keyboard integrated in the screen image The invention relates to two free-standing hand-held manual controls to be hand-held in order to control the choice of keys in a virtual keyboard or control panel which forms an integral part of a screen image. The manual controls can be used for a PC, iPad, mobile phone and all electronic equipment in which there is a need to control a large number of keys in one or more keyboard images with the aid of a few keys on two manual controls. The manual controls have a key for each finger, which is dedicated to specific functions in the writing process, and some extra keys which are principally thumb keys.

The manual controls can be used directly as a writing apparatus with associated keyboard images in order to control the choice of characters in the virtual keyboard, or as a control panel for a car, for a control stick for an aircraft, for excavators, robot control (detonation robots, ROVs), elite gamblers, etc., in which there is a need to focus both hands and eyes in one direction.

In the present invention, the keys are moved to the fingers unlike traditionally where the fingers are moved to the keyboard. The writing apparatus gives a free hand position with support and lighter key pressure than with an ordinary keyboard. A user does not need to look at the finger keys and relates only to the activity in the virtual keyboard/the screen image.

We assume that this form of keying-in of characters will give a good work position, and that the possibility of freely placing arms and hands will increase blood circulation and give increased writing comfort.

As an example, the integrated keyboard which is usually situated in the lower part of the screen image, can consist of 3×10 keys, and there can be 2 cursors which can be moved independently of each other, for example on the right and left side of the keyboard image. When a user puts his hands in the manual controls, a cursor will position itself in the middle row and then each cursor highlights 5 characters. Upon a slight movement of the hand in one or other direction, a cursor is placed in respectively a lower or upper row. Characters and symbols/functions can be chosen with the aid of finger keys in the areas which are highlighted. In order that arms and hands shall freely be able to be placed in the desired position in the writing process itself or in the keying-in process, it is an advantage for these manual controls to be wireless, lightweight and well adapted from an ergonomic perspective. This also means that the manual controls must have some built-in sensors which register the movements which are needed to move the cursors in the keyboard image. This can be, for example, a sideways "joystick" movement, a to-and-fro "joystick" movement, an up and down with the arm movement, a to-and-fro with the arm movement, a swing the arm to the side movement, i.e. all possible movements which can be made in combination with pressing of the finger keys. Further research will show which of these movements is the best with a view to minimalizing the muscle load in the writing process. This means also that the manual controls must have some built-in sensors which register the movement which is needed to shift between the different keyboard images. This movement is not executed as often, but can also be all possible movements which can be made in combination with pressing of the finger keys. Connection can also be made to two wireless rocker foot switches or foot sensors, which control the movement of a cursor in the keyboard image.

Built-in sensors can be 1. sensors which register the actual movement of the manual control—as is used in different video games, and converts the hand movement into movement of cursors in the keyboard image and into shift between different keyboard images, or it can be 2. sensors which register the angle of a manual control on the basis of horizontal and vertical position, or compass position, and which converts the hand movement into movement of a cursor in the keyboard image and into shift between different keyboard images. Both types of sensors should be able to be adjustable such that it is easy to fine-tune these and find the optimal range of movement for the hand and the optimal angling for the hand.

A user does not need to look at the hand keys when he or she is writing and the gaze is fixed on the keyboard image which is integrated in the screen image during the writing process. The hand shall therefore be able to be placed in the desired free position, outside the field of vision, but we have nevertheless chosen four basic positions. We can write 1. with the arms hanging straight down, 2. in the armrest position, 3. in the armrest position with the hands in front of the body position, 4. with the arms raised at 45° out from the body position. And we can place arms/hands in all positions between these. The arms should have a support for the shoulders in position 2, 3 and 4, but not necessarily in position 1.

One advantage of certain embodiments is the wireless manual controls and how the manual controls act to choose keys in the integrated keyboard image. The choice of keys is basically a positioning of the manual control in combination with a choice of finger keys. The choice of keyboard images is basically another positioning of the manual control in combination with a choice of finger keys. Notably, it is easy to change the different key functions and easy to change different positioning functions for the manual controls. This is simple configuration/reprogramming and is necessary in order to find the optimal combination of movement and choice of finger keys. The establishment of the optimal combinations of positioning of the hand in combination with a choice of finger keys continues to be the subject of research.

As an ergonomic writing apparatus for a PC, which is a refinement of a traditional keyboard, the apparatus includes a keyboard screen (2) which is integrated in the ordinary screen image (1), alternatively an independent keyboard screen (3), which interacts with a control unit (59, 60, 61).

When the control arm/lateral joystick is moved, then two cursors (12), which can be maneuvered independently of each other and simultaneously, are displaced over the columns of characters in the keyboard image. In certain embodiments, each control arm can be moved in three, four, or five different positions.

In one embodiment the mouse cursor is moved up and down on the screen with the thumb using a progressively adjustable wheel, and the mouse cursor is moved sideways by one or more of the other fingers by using another progressively adjustable wheel. In another embodiment the keys on one controller can be used with the progressively adjustable wheel for moving the cursor on the other controller, which will give the mouse keys and wheels on each of the controllers an overlapping function.

A choice of keys in the keyboard windows and control of the ordinary PC functions is realized by finger keys (72, 73, 74, 75, 6, 7, 8, 63+76, 77, 78, 79, 9, 10, 11, 64) on a manual control (50). A character can be chosen in the field highlighted in the keyboard image—by that finger on the manual control which corresponds to the chosen key in the keyboard image. Software for the keyboard image has as its main function to combine axis position/arm position with finger keys in order thereafter to forward the chosen character to the active program window via a standard USB, alternatively wireless communication.

Three alternatives for a control unit, which are operated from a work chair used together with a mini keyboard and a stationary hand mouse or foot mouse (29), are laid out.

The window which shows the keyboard is an integral part of the ordinary screen image when the PC is switched on, alternatively it can be fitted as an independent keyboard screen directly below the ordinary screen.

In this standard screen image, space has been set aside in the primary region for 4 rows×10 columns=40 characters. The secondary region of the keyboard screen is a tool which shows placement of thumb keys on manual control and joystick.

Three alternatives for control units, which are based on the same principle, are laid out. Characters are controlled by 4 keys for right hand and 4 keys for left hand, together with an arm/hand movement. When control arm or lateral joystick is moved, then 2 cursors are displaced over the letter columns in the keyboard image. The cursors can be displaced independently of each other and simultaneously.

There are five sideways positions for each hand/arm. A character in the topmost row in the keyboard, at the site of the cursor, is chosen by pressing of an index finger key, in the second row a choice is made by pressing of a long finger key, in the third row by pressing of a ring finger key, and in the fourth row by pressing of a little finger key.

On the right thumb are placed, in the standard version of the hand control, four keys: Enter, Backspace, Delete and Full Stop. On the left thumb are also placed four keys: Numbers, Shift, Caps Lock and Space.

The numbers key makes it possible to choose between keyboard images: Small letters and Number symbols. The Shift key makes it possible to choose between the keyboard images: Small letters and Large letters. Caps Lock makes it possible to choose between Small letters and Large letters.

The control units can be moved in 5 sideways positions for each arm/hand, a middle position, to which the arm/hand automatically returns, two extreme positions and two intermediate positions.

The unit is designed such that it shall be quick and easy to locate the cursor. Extreme position and middle position have a small contact surface against the cursor, because these positions are easy to place. Intermediate position has a substantially larger contact surface against the cursor, which makes this position, too, easy to place.

The control unit communicates with PC, keyboard screen and ordinary screen through a standard USB by using interface electronics for standard joysticks and is based on using standard drivers from the different operating systems. The control unit can alternatively communicate wirelessly with the PC.

The software uses axis position for control arm/lateral joystick for positioning of cursor in the keyboard image, and 4 finger keys for choice of row in the keyboard image. The main function of the software is to combine axis position with finger keys so as thereafter to forward the chosen character to the active program window/application.

In an integrated keyboard screen there is a possibility for both standard screen division and a transparent solution which can be placed over the actual application. The keyboard screen shall be clearly visible on the screen, but must not disturb the choice of active program/application by the user. It is possible to displace the integrated keyboard window to the right or left side of the screen and possibly drop it onto the taskbar if so desired.

The advantage of placing the keyboard in the lower part of the PC screen is that there is a shorter distance from keyboard to ordinary screen. This means less strain on neck musculature, because the gaze will rest on the screen to a greater degree than if a normal keyboard is used. The height of an ordinary PC screen can advantageously be adjusted somewhat higher than traditionally. A mini keyboard on the control unit makes it possible to insert keys for other specific functions. One proposal for functions can be: tabulator, arrow keys, escape, escalation of keyboard image, change of language for character set.

In alternative 1 for a control unit, the arms rest each in their respective unit, which is operated from a pivotable arm on the armrest of a work chair. Choice of keys in the keyboard screen is controlled by a sideways movement of the arm in combination with 4 finger keys on the manual control.

In alternative 2, both arms hang straight down and the arms rest each in their respective control unit, which is operated from a work chair and can be moved to and fro. Choice of keys in the keyboard image is controlled by a to-and-fro movement of the forearm in combination with 4 finger keys on the manual control.

In alternative 3, the arms rest each in their respective control unit, which is operated from a pivotable arm on the armrest and which can be locked in different positions. On the pivotable arm are mounted two lateral joysticks. Choice of keys in the keyboard screen is controlled by sideways movement of the joystick in combination with 4 finger keys on the joystick. These three control units are meant to be coupled up to a stationary PC, but, if need be, can be used with a portable PC.

This writing apparatus is intended for use together with a foot mouse, in which one pedal controls the cursor and the other pedal controls right and left click, alternatively another type of foot mouse. A foot mouse will replace a traditional mouse, or can possibly be used together with a traditional mouse. With the aid of a foot touch switch, the left and right pedal shall also be able to control Space and Full Stop respectively. Alternatively, this writing apparatus can be used together with a stationary mouse, in which the cursor is controlled by a ball, or possibly another type of hand or foot mouse.

In principle all characters, symbols and functions in an ordinary keyboard could be placed in a keyboard image or as ordinary keys. When not all functions in the ordinary keyboard are included in this patent application, it is because it is not a detailed placement of all the key functions which is important in this matter. The crux is the description of the control unit, the keyboard screen and the interaction between control unit, keyboard screen and ordinary PC screen. Displacement of keyboard keys in the different screen images and displacement of ordinary keys is relatively simple programming.

The structure of keyboard images can thus be adapted to specific requirements. It is therefore a point that standard letter size in the keyboard screen, number of columns and rows in the keyboard screen, placement of individual keys in the keyboard screen, number of keys and placement thereof on the control unit, and number of sideways positions for control arm and joystick must be possible to change on the basis of customer requirements.

Another important point with the control unit is that it shall be easy to make ergonomic adaptations. It shall therefore be adjustable such that it is easy for the individual user to have his workplace adapted; height of armrest, displacement of axis point, balancing of to-and-fro movement with a weight, spring for sideways and to-and-fro movement, adjustment of control arm and locking mechanism. The adjustment possibilities are a prerequisite for being able to vary the load upon different muscle groups.

The invention has been described in some detail by way of illustration and example for purposes of clarity of understanding. However the description is not meant to limit the scope of the claims. The invention being thus described, it will be apparent to those skilled in the art that the same may be varied in many ways without departing from the spirit and scope of the invention. Such variations are included within the scope of the following claims.

I claim:

1. Ergonomic writing apparatus for at least one of a PC and/or refinement of a traditional keyboard, comprising:
    a control unit, working in combination with a keyboard image,
    wherein the keyboard image is integrated in a PC screen or on an independent keyboard screen,
    wherein, when the keyboard image is integrated in the PC screen, the keyboard image occupies little space in a lower part of the PC screen,
    wherein characters and other functions which are shown in the keyboard image, can be chosen with the aid of the control unit, the keyboard image comprises a complete alphabet and one or more symbols, the keyboard image is clearly visible on the PC screen or the independent keyboard screen, placement of characters in the keyboard image is approximately the same as the placement of keys in the traditional keyboard,
    wherein two separate manual controls, which, with the aid of an arm, hand or another body movement, each control a respective cursor in a left half and a right half of the keyboard image,
    wherein the manual controls include control arms or joysticks,
    wherein the cursors can be displaced simultaneously and independently of each other, choice of characters on the keyboard image and control of the ordinary PC functions is made by finger keys on the manual control,
    wherein the keyboard image includes specific fields of characters that are each selectable by the cursors,
    wherein the manual controls include individual finger keys,
    wherein each of the finger keys controls one of the characters within the selected one of the specific fields of characters, which is highlighted in the keyboard image,
    wherein moving each of the manual controls moves each of the respective cursors and respectively selects one of the specific fields of characters in the keyboard image to determine which character each of the finger keys controls,
    wherein the physical placement of the finger keys on the manual control is arranged such that this placement is easy to associate with the physical placement of the characters in the keyboard image, wherein all the finger keys can be activated and dedicated to specific functions,
    wherein it is possible to shift between three keyboard windows of the keyboard image which each have a fixed set of characters, and
    wherein the number of keyboard images can be extended, the other functions for the PC are present as keys on a mini keyboard, via a stationary mouse which controls a cursor, or via two foot pedals which control a cursor.

2. Writing apparatus for a PC according to claim 1, wherein the two cursors in the keyboard image are stood vertically, when the manual controls are moved, then the two vertical cursors are displaced over columns of the characters in the keyboard image to select the specific field of characters, a character in the topmost row, at the site of the cursor, can be chosen by pressing of an index finger key on the manual control, a character in the second row in the keyboard image can be chosen with a long finger key on the manual control, a character in the third row in the keyboard image can be chosen with a ring finger key on the manual control, and a character in the fourth row in the keyboard image can be chosen with a little finger key on the manual control,
    wherein a choice and a switch between different keyboard images can be made with simple key presses with the thumb: small letters, large letters, numbers/symbols and possibly other keyboard images.

3. Writing apparatus for a PC according to claim 1, further comprising software for the keyboard image, wherein the control unit communicates with the PC through a standard USB by using interface electronics for standard joysticks and is based on using standard drivers from the different operating systems, the system employs two analogous axes, an axis, eight finger keys for the left hand, eight finger keys for the right hand, the software uses the axis position for positioning the cursor and the finger keys for choosing the character in the highlighted specific field of characters, the finger keys can be used to shift between keyboard windows and can be used as Shift, Caps Lock, Backspace, Delete, Enter, Space and Full Stop, the character set of the keyboard image is based on the choice of language which is made at system level,
    wherein the main function of the software is to combine the axis position with the functions of the finger keys so as thereafter to forward the chosen character to the active program window or application,
    wherein, when the keyboard image is integrated into a PC screen, at least one of a standard screen division and/or a transparent solution can be used, wherein the transparent solution can be placed over the program window or application, the keyboard screen is clearly visible on the PC screen and does not disturb the choice of active program or application by the user, and wherein the integrated keyboard window can be displaced to the right side or the left side of the PC screen and dropped onto the taskbar.

4. Writing apparatus for a PC according to claim 1, wherein the character set is based on the choice of language which is made at system level, and wherein the characters in the keyboard image are adaptable to different languages, different language signs, symbols, pictorial signs, numbers, and other expressions of language.

5. Writing apparatus for a PC according to claim 1, wherein the standard size of the keyboard image is adaptable according to requirement, or wherein the size of the characters in the keyboard image is adjustable, wherein the standard size of the keyboard image includes the number of columns and the number of rows in the keyboard image.

6. Writing apparatus for a PC according to claim 1, further comprising keyboard image that is integrated in a PC screen, wherein the standard size for the integrated keyboard image is 3×10=30 keys,
    wherein the two cursors can be displaced independently of each other and simultaneously,
    wherein a primary region of the keyboard image shows a set of characters, and a secondary region of the keyboard image can be shown in the keyboard image,
    wherein the secondary region is a tool for seeing the placement of thumb keys on the manual control, the secondary region shows three or more thumb keys depending on which solution is chosen.

7. Writing apparatus for a PC according to claim 1, wherein standard placement of keys on the manual control can be changed, and the number of keys on the manual control can be adapted according to requirement.

8. Writing apparatus for a PC according to claim 1, wherein the manual control has four thumb keys mounted on each hand as a standard number and placement, on the left thumb:

delete, numbers, space and key, on the right thumb there are placed four keys: full stop, enter, backspace and key, in this solution for the manual control the thumb also plays a part in controlling characters in the keyboard image, wherefrom the designation: "key", delete is an erasure key, numbers key makes it possible to choose between keyboard images: small letters, large letters and number symbols, space ensure interspaces between words, full stop, enter and backspace are self-explanatory.

9. Writing apparatus for a PC according to claim 1, wherein the manual control has 5 positions, which correspond to the cursor on the keyboard image, these are 5 standard positions, wherein the number of positions is adaptable according to requirement.

10. Writing apparatus for a PC according to claim 1, wherein the control unit for the keyboard image is mounted such that the control arms hang straight down, and wherein arm movement is a to-and-fro movement, the control unit is mounted on an office chair with an elbow shape, a hand shape, and the manual control with the control arm for each hand,
wherein the axis and the ball bearing are mounted such that the control arm is moved movable to and fro, the cursor on the keyboard image is moved when the control arm is displaced to and fro,
wherein the control unit, which is fitted for hanging arms can also be adjusted up and down, and the angle of the control arm can be lifted up to 90°, an adjustable weight is fitted in the rear of the control unit in order to balance the control arm, a spring for to-and-fro movement is adjustable, the armrest can be height-adjusted in relation to the seat.

11. Writing apparatus for a PC according to claim 1, wherein the apparatus is usable together with: a stationary hand mouse having a ball which controls a cursor, wherein the hand mouse is primarily mounted on one of the control arms, or in some other usable place,
wherein the writing apparatus is usable together with other types of hand mouse, or a foot mouse, wherein one foot controls a cursor and the other foot controls a right and left click.

12. Writing apparatus for a PC according to claim 1, further comprising a sensor which registers arm movement and the use of the finger keys, wherein a signal appears in a combination of arm positioning and use of the finger keys, which the signal is forwarded to a transmitter, which relays a wireless signal that goes to a receiver and a signal processor, wherein the signal passes on to a disk, which relays the signal to the keyboard image screen,
wherein a battery and a charging station are fitted as a part of the transmitter, the transmitter and the receiver are mounted such that optimal contact is opened, the sensor for arm movement can be laterally adjusted such that the sensor opens a good arm position.

13. Writing apparatus for a PC according to claim 1, wherein signals between the control unit and the PC go directly through a standard USB and not via a transmitter and a receiver.

14. Writing apparatus for a PC according to claim 1, wherein a small side panel or a mini keyboard is fitted, and wherein the writing apparatus is mounted on the control arm for the control unit,
wherein finger keys for four arrow keys, tabulator, escape, change of language for character set, adjustment of the size of the keyboard image, and other specific functions can be included on the control arm,
wherein the mini keyboard can have a configuration other than that which has been proposed, the number of finger keys on the mini keyboard can be changed based on requirement.

15. Ergonomic writing apparatus for a PC, comprising:
two manual controls with dedicated finger keys for each finger,
wherein the finger keys control the choice of characters in a virtual keyboard integrated in a keyboard image,
wherein the characters include keys, symbols, and functions,
wherein the manual controls have a plurality of sensor types built in that can register different movements of the hand in different positions, and
wherein these movements and signals from the sensors move cursors for each of the manual controls in at least one of the keyboard image and/or the control panel and allow movement between different keyboard images,
wherein the keyboard image includes specific fields of characters that are each selectable by the cursors,
wherein each of the finger keys controls one of the characters within the selected one of the specific fields of characters,
wherein moving each of the manual controls moves each of the respective cursors and respectively selects one of the specific fields of characters in the keyboard image to determine which character each of the finger keys controls.

16. Writing apparatus according to claim 15, wherein the manual controls are strapped to the hand.

17. Writing apparatus according to claim 15, wherein a connection can be made to two simple wireless rocker foot switches or foot sensors, which control movement of the cursors in the keyboard image.

18. Writing apparatus according to claim 15, wherein there are five finger keys on each manual control which control the choice of the characters in the keyboard image, and other finger keys on the manual controls which control the most ordinary PC functions, these being principally controlled by thumb keys.

19. Writing apparatus according to claim 15, further comprising sensors which directly register the actual movement of the manual control and transfer hand movement to displacement of the cursors in the keyboard image, or transfer the hand movement to shifting between the different keyboard images.

20. Writing apparatus according to claim 15, further comprising sensors which register the angle of the manual control on the basis of horizontal and vertical position, or compass position, where the sensors will have a different function in a first position, hanging arms versus a second position, a third position, and a fourth position, positions and where a change of angle is registered, which transfers a hand movement to displacement of the cursors in the keyboard image, or a change of angle in another hand movement to shifting between the different keyboard images.

21. Writing apparatus according to claim 15, wherein movement of a cursor the cursors in the keyboard image can result from a sideways "joystick" hand movement, a to-and-fro "joystick" hand movement, an up and down with the arm movement, a to-and-fro with the arm movement, a swing the arm to the side movement, wherein all possible movements can be made in combination with pressing of the finger keys.

22. Writing apparatus according to claim 15, wherein a change of the keyboard images is made with a sideways "joystick" hand movement, a to-and-fro "joystick" hand movement, an up and down with the arm movement, a to-andfro with the arm movement, a swing the arm to the side movement, or any other that can be made in combination with pressing the finger keys.

\* \* \* \* \*